(12) United States Patent
Steffier

(10) Patent No.: US 7,988,395 B2
(45) Date of Patent: Aug. 2, 2011

(54) MECHANICAL FASTENER SYSTEM FOR HIGH-TEMPERATURE STRUCTURAL ASSEMBLIES

(76) Inventor: Wayne S. Steffier, Huntington Beach, CA (US)

(*) Notice: Subject to any disclaimer, the term of this patent is extended or adjusted under 35 U.S.C. 154(b) by 384 days.

(21) Appl. No.: 12/321,638

(22) Filed: Jan. 23, 2009

(65) Prior Publication Data
US 2010/0189529 A1    Jul. 29, 2010

(51) Int. Cl.
*F16B 35/02*    (2006.01)

(52) U.S. Cl. .................... 411/385; 411/283; 411/904

(58) Field of Classification Search .............. 411/385, 411/383, 368, 904; 403/24
See application file for complete search history.

(56) References Cited

U.S. PATENT DOCUMENTS

| | | | | |
|---|---|---|---|---|
| 2,388,273 A * | 11/1945 | Lord | | 411/266 |
| 3,922,946 A * | 12/1975 | Grayson | | 411/385 |
| 4,478,546 A * | 10/1984 | Mercer | | 411/385 |
| 4,975,014 A * | 12/1990 | Rufin et al. | | 411/385 |
| 5,007,781 A * | 4/1991 | Jensen et al. | | 411/337 |
| 5,073,072 A * | 12/1991 | Parekh et al. | | 411/354 |
| 5,634,754 A * | 6/1997 | Weddendorf | | 411/354 |
| 6,042,315 A * | 3/2000 | Miller et al. | | 411/411 |
| 6,045,310 A * | 4/2000 | Miller et al. | | 411/383 |
| 6,474,920 B2 * | 11/2002 | Lin | | 411/385 |
| 6,907,920 B2 * | 6/2005 | Warburton et al. | | 165/168 |
| 7,153,054 B2 * | 12/2006 | Arbona | | 403/28 |
| 7,628,053 B2 * | 12/2009 | Bermudez, III | | 72/481.6 |

* cited by examiner

*Primary Examiner* — Gary Estremsky
(74) *Attorney, Agent, or Firm* — Morland C. Fischer

(57) ABSTRACT

A relatively low cost, lightweight and thermal stress-free mechanical fastener system having particular application for reliably joining together high temperature structural members (e.g., a pair of flat fiber-reinforced ceramic composite plates). The mechanical fastener system includes a ceramic composite fastener having a semi-circular head at one end to be countersunk in the structural members to be joined together and a dove tail retention feature formed in the shank or root at the opposite end. The composite fastener has a 2-dimensional (i.e., flat) profile that facilitates an economic manufacture thereof from densified ceramic composite material. A matched pair of thread forms having external threads and an internal dove tail relief to match the dove tail retention feature at the root of the composite fastener is held in face-to-face mating engagement with one another so as to establish a mechanical interlock around the root of the composite fastener. A 2-dimensional ceramic backing washer has a rectangular center hole dimensioned to receive the root of the composite fastener therethrough. A nut having internal threads that correspond to the external threads of the pair of thread forms is rotated into surrounding engagement with the thread forms to prevent a removal of the composite fastener and a separation of the structural members.

17 Claims, 1 Drawing Sheet ically joining smaller component sub-assemblies. Conventional metallic fasteners and fastening techniques have both limited application and ability to withstand high temperature and, consequently, do not provide structurally tight joints over a wide temperature range. A metallic fastener, which is snug at room temperature, will loosen at elevated temperature due to its relatively high thermal expansion. Excessive preloading at room temperature to maintain a tight joint at elevated temperature may be detrimental to the structural integrity of the joint.

MECHANICAL FASTENER SYSTEM FOR HIGH-TEMPERATURE STRUCTURAL ASSEMBLIES

BACKGROUND OF THE INVENTION

1. Field of the Invention

The present invention relates to a mechanical fastener system suitable for reliably joining high-temperature composite structural assemblies.

2. Background Art

Load-bearing high temperature (i.e., hot) structures fabricated from ceramic composite materials are a promising option for manufacturing specialized components to be used in the manufacture of new high-speed aircraft, atmospheric entry vehicles and propulsion systems in order to advantageously reduce weight and increase operational performance and reliability. An important consideration in the design of such hot structures is the ability to be able to reliably join and hold the component parts together under the extreme loads to which such structures will be subjected. Large-area hot structures will likely be fabricated by mechanically joining smaller component sub-assemblies. Conventional metallic fasteners and fastening techniques have both limited application and ability to withstand high temperature and, consequently, do not provide structurally tight joints over a wide temperature range. A metallic fastener, which is snug at room temperature, will loosen at elevated temperature due to its relatively high thermal expansion. Excessive preloading at room temperature to maintain a tight joint at elevated temperature may be detrimental to the structural integrity of the joint.

Mechanical fasteners fabricated from thermo-elastically compatible ceramic composite materials, however, circumvent the inherent limitations of high-temperature metallic fasteners and thus offer an improvement over the performance of mechanically fastened joints in hot composite structures. Conventionally shaped ceramic composite fasteners can be designed to exhibit near-perfect thermo-elastic compatibility with the adjoining ceramic composite elements. Nevertheless, the prohibitively high cost to produce most conventional composite fasteners is a disadvantage that impedes their widespread utilization.

Therefore, it would be desirable to have available a method for making a cost-effective thermal stress-free ceramic composite mechanical fastener system that is suitable for joining high-temperature ceramic composite structural assemblies.

SUMMARY OF THE INVENTION

In general terms, a relatively low-cost, lightweight and thermal stress-free mechanical fastener system is disclosed having particular application for joining high temperature composite structural elements (e.g., a pair of flat fiber-reinforced ceramic composite plates that are aligned face-to-face one another) of the kind which may be used to manufacture aerospace vehicles, aircraft, and the like, which are often subjected to high temperatures and extreme loads. The structural (i.e., plate) elements are pre-machined to accommodate the fastener system therebetween. The fastener systems is manufactured with a 2-dimensional profile that matches the machining of the structural elements to ensure that the structural elements will be reliably held together.

The fastener system herein disclosed includes a flat, 2-dimensional fiber-reinforced ceramic composite fastener having a semi-circular head at one end for receipt within a correspondingly shaped cavity that is countersunk into the structural elements. The opposite shank or root end of the composite fastener has a dove tail (e.g., a step) machined therein. Each one of a matched pair of refractory metal or ceramic thread forms has a threaded exterior and a dove tail (e.g., a step) formed at the interior thereof which corresponds with the dove tail at the root of the composite fastener so that the thread forms can be held in face-to-face alignment with each other and in surrounding interlocking engagement with the fastener. In the assembled fastener configuration, the root of the composite fastener is received through the pair of structural elements and the center slot of a 2-dimensional ceramic composite backing washer that is located against one of the structural elements. A threaded refractory metal or ceramic nut is then rotated into mating engagement with the pair of thread forms at the threaded exteriors thereof in order to prevent a removal of the composite fastener and a separation of the structural elements.

DETAILED DESCRIPTION OF THE INVENTION

Figure 1:
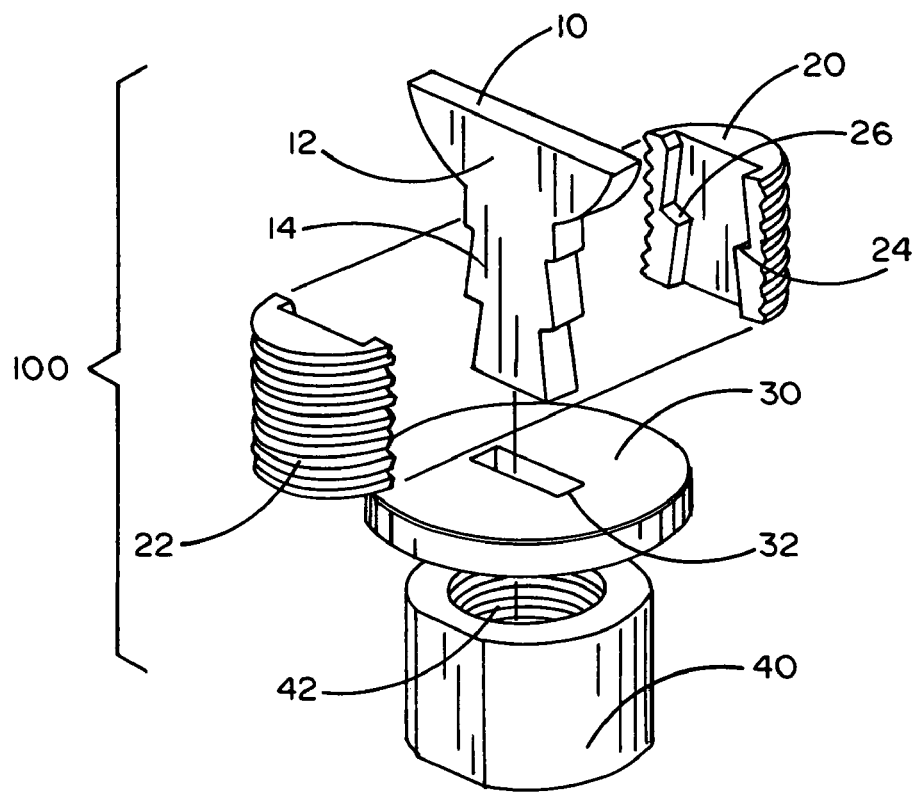
FIG. 1 shows an exploded view of a ceramic composite mechanical fastener system according to a preferred embodiment of the present invention.

FIG. 1 of the drawing shows a preferred embodiment for a relatively low cost, lightweight, and thermal stress-free ceramic composite mechanical fastener system 100 having particular application for joining a high temperature structural assembly. The fastener system 100 includes a 2-dimensional fiber-reinforced ceramic composite fastener 10, a matched pair of refractory metal or monolithic ceramic thread forms 20 and 22, a 2-dimensional ceramic composite backing washer 30, and a refractory metal or monolithic ceramic nut 40. Unlike conventional axisymmetric-shaped fasteners, the fastener system 100 herein disclosed has a unique 2-dimensional (i.e., flat) profile which enables a relatively easy and economical manufacture thereof and a reliable joinder of the high temperature composite assembly. This unique profile and the geometries of the aforementioned components of the fastener system 100 to be described in grater detail hereinafter may be achieved, for example, by conventional machining or powder injection molding techniques.

Ceramic composite as referred to herein is preferably a high-temperature structural material comprising a fiber preform of high strength fiber-reinforcement having a fiber coating and embedded in a ceramic matrix.

Fiber-reinforcement as referred to herein is preferably any refractory fibers, either continuous or discontinuous, used for producing a fibrous preform texture, which are capable of withstanding a use temperature of at least 800° C. in an atmosphere which is thermochemically compatible with the selected fiber without suffering fundamental chemical, physical or mechanical degradation. Examples include carbon fibers, silicon carbide fibers, silicon nitride fibers, aluminum oxide fibers, etc.

A fiber preform as referred to herein is preferably a fibrous texture defined as any assemblage of one or more reinforcing fiber types produced by weaving, braiding, filament winding, fiber placement, felting, needling, or other textile fabrication process.

Fiber preforming as referred to herein is preferably a textile fabrication process by which the collimated multifilamentary fiber bundles (tows) are placed and maintained in a fixed position for purposes of controlling both their orientation and content within a given volumetric space. As such, the spatial arrangement of fibers is referred to as a preform architecture.

Fiber coating as referred to herein is preferably any refractory composition of either carbon, metal carbide, metal nitride, metal boride, metal silicide, metal oxide, or combinations thereof which is (are) deposited (for example, by chemical vapor infiltration) onto the refractory fibers either before or after fiber preforming for purposes of controlling the fiber/matrix interfacial bonding characteristics in the resultant composite. The resultant fiber coating thus encapsulates the reinforcing fibers. Examples of such coatings include pyrolytic carbon, silicon carbide, silicon nitride, boron carbide, and boron nitride, either as a single-layer phase, multilayered phase or as a phase of mixed composition.

Ceramic matrix as referred to herein is preferably any refractory composition of either carbon, metal carbide, metal nitride, metal boride, metal silicide, metal oxide, or combinations thereof which is subsequently deposited (for example, by chemical vapor infiltration) onto the previously coated refractory fibers within the fibrous preform thereby encapsulating the fibers and consolidating the preform into the resultant densified composite material. The reinforcing fibers of the fibrous preform thus become embedded within and supported by the surrounding matrix. Examples include pyrolytic carbon, silicon carbide, silicon nitride, boron carbide, and boron silicide, either as a single phase, multilayered phase or as a phase of mixed composition.

The 2-dimensional ceramic composite fastener 10 shown in FIG. 1 is the primary structural element of the mechanical fastener system 100. The ceramic composite fastener 10 is preferably manufactured from a carbon fiber-reinforced silicon carbide matrix (C/SiC) composite material or a silicon carbine fiber-reinforced silicon carbide matrix (SiC/SiC) composite material. The fastener 10 has a flat profile with a semi-circular head 12 formed at one end and a single or multiple step dove-tail formed in the shank or root 14 at the opposite end. By virtue of its flat profile, the fastener 10 can be efficiently fabricated from flat plate stock manufactured from densified high strength fiber-reinforced ceramic composite material. The semi-circular head 12 of fastener 10 enables a thermal stress-free interface with the high-temperature composite structural assembly and facilitates machining the adjoining structural element members of the assembly to be held together. By way of example only, the structural joint element members of the assembly to be joined and held together by means of the fastener system 100 herein disclosed are a pair of flat, fiber-reinforced ceramic composite plate members (designated 50 and 60 in FIG. 2 of the drawings) that are aligned face-to-face one another.

Figure 2:
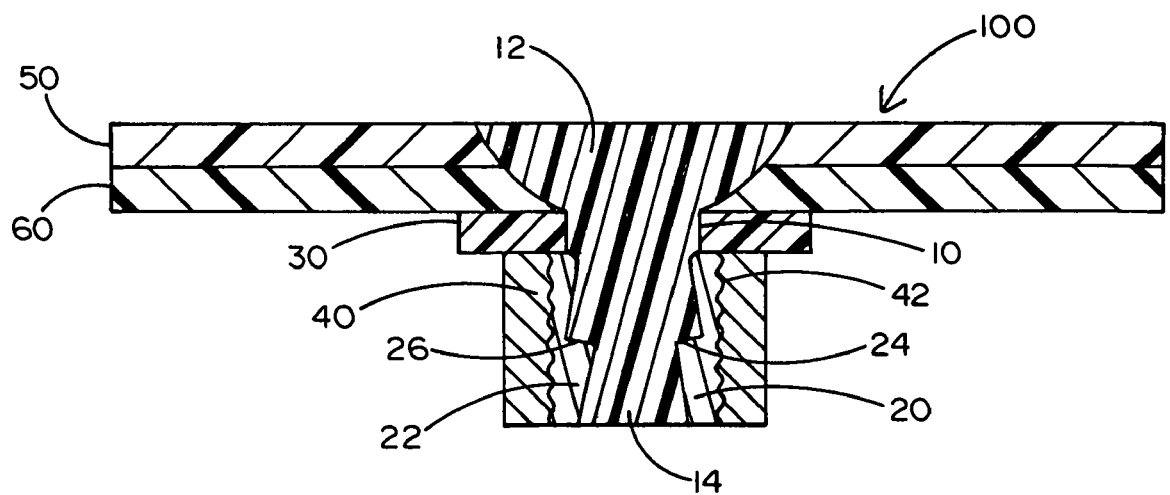
FIG. 2 is a cross-section showing the ceramic composite mechanical fastener system of FIG. 1 being used to join and secure an assembly comprising a pair of flat (e.g., ceramic composite) structural elements.

Machining the flat plate members 50 and 60 of FIG. 2 to accommodate the composite fastener 10 is, for example, performed by plunging a small diameter circular diamond cutter (similar to a hand circular saw) of a specified thickness into the pair of plate members 50 and 60 at a specified depth to produce a circular countersunk feature that corresponds to the flat profile and thickness of the semi-circular head 12 of fastener 10. With the fastener 10 inserted through the pair of plate members 50 and 60 in the manner shown in FIG. 2, there is no need for a traditional slotted head feature to provide counter-torque during assembly, because the trapped head 12 of fastener 10 will advantageously resist the preload torque moment and provide a flush, "aerodynamically-clean" assembled outer surface. This benefit allows the fastener system 100 to be used in applications where there is limited access from one side of the mechanically fastened structural assembly. It should be appreciated that the composite fastener 10 of fastener system 100 can be fabricated with other fastener head geometries such as, for example, conical, without departing from the scope and advantage of the present invention.

The dove-tail configuration having one or multiple steps at the root 14 of the ceramic composite fastener 10 functions to restrain the fastener 10 within the pair of ceramic thread forms 20 and 22 by means of mechanical interference when the thread forms are disposed in face-to-face alignment around the root 14 during assembly. The pair of thread forms 20 and 22 are preferably manufactured from an alumina ceramic ($Al_2O_3$) material or a zirconia ceramic ($ZrO_2$) material. The opposing thread forms 20 and 22 are employed as a matched pair having external threaded surfaces and internal dove tail relief (e.g., step) features 24 and 26 which correspond to the shape of the dove tail steps at the root 14 of the fastener 10. The threaded external surfaces of thread forms 20 and 22 preferably include "Edison" or lamp-style threads. The internal dove tail steps 24 and 26 are recessed into each thread form 20 and 22 to enhance an interlocking relationship between the dove tail steps of the thread forms 20 and 22 with the dove tail steps of the fastener 10. It should be understood, however, that the composite fastener 10 and the pair of thread forms 20 and 22 located therearound can be fabricated with other interlocking root retention geometries, such as, for example, single dove-tail or multiple sinusoidal features, without departing from the scope and advantage of the present invention.

In the assembled fastener configuration of FIG. 2, the stepped root 14 of composite fastener 10 is first received through the pair of structural plate members 50 and 60 and then through a rectangular center slot 32 formed in the ceramic composite backing washer 30. The size of the center slot 32 of washer 30 corresponds to the cross section of the root 14 of fastener 10. During assembly, the washer 30 is located below and is forced against one of the pair of structural plate members 50 and 60. The washer 30 has a flat profile and is preferably manufactured from a carbon fiber-reinforced silicon carbide matrix (C/SiC) composite material or silicon carbon fiber-reinforced silicon carbide matrix (SiC/SiC) composite material.

The matched pair of ceramic thread forms 20 and 22 are held face-to-face one another in surrounding mating engagement with the root 14 of fastener 10 by means of the nut 40. The nut 40 has a threaded interior 42 so that the nut can be rotated during assembly into engagement around the external threaded surfaces of the opposite facing thread forms 20 and 22 which surround the root 14 of fastener 10, whereby to complete the fastener system 100 and thereby prevent a removal of the composite fastener 10 and a separation of the structural plate members 50 and 60. The threaded interior 42 of nut 40 preferably includes the same "Edison" or lamp-style threads as the pair of thread forms 20 and 22 so as to minimize the concentration of stress and improve resistance to thermal shock likely to be experienced when the brittle nut 40 is connected in surrounding engagement with the brittle thread forms 20 and 22 in the manner earlier described. The nut 40 is preferably manufactured from an aluminum ceramic ($Al_2O_3$) material or a zirconium ceramic ($ZrO_2$) material.

The invention claimed is:

1. A mechanical fastener system, comprising:
   a composite fastener having a semi-circular head at one end and a shank at the opposite end, said shank having at least one dove tail formed therein;
   a pair of thread forms to be disposed in face-to-face alignment so as to surround the shank of said ceramic composite fastener, each of said pair of thread forms having a threaded exterior and an interior relief that matches the at least one dove tail of said composite fastener;
   a composite washer having a center slot to receive the shank of the composite fastener therethrough such that said washer is located below the semi-circular head of said fastener; and
   a nut having a threaded interior to be rotated into mating engagement around the threaded exteriors of said pair of thread forms, whereby to hold the at least one dove tail of the shank of said fastener in interlocking engagement within the reliefs of said pair of thread forms.

2. The mechanical fastener system recited in claim 1, wherein said ceramic composite fastener has a flat profile.

3. The mechanical fastener system recited in claim 1, wherein each of the pair of thread forms is manufactured from a refractory metal.

4. The mechanical fastener system recited in claim 1, wherein each of said pair of thread forms is manufactured from a monolithic ceramic material.

5. The mechanical fastener system recited in claim 1, wherein said nut is manufactured from a refractory metal.

6. The mechanical fastener system recited in claim 1, wherein said nut is manufactured from a monolithic ceramic material.

7. The mechanical fastener system recited in claim 1, wherein the at least one dove tail formed in the shank of said ceramic composite fastener is a step that is shaped to lie within and create a mechanical interface against the interior reliefs of said pair of thread forms when said pair of thread forms surround said shank.

8. The mechanical fastener system recited in claim 1, wherein said ceramic composite fastener is manufactured from a carbon fiber-reinforced silicon carbide matrix (C/SiC) composite material.

9. The mechanical fastener system recited in claim 1, wherein said ceramic composite fastener is manufactured from a silicon carbide fiber-reinforced silicon carbide matrix (SiC/SiC) composite material.

10. The mechanical fastener system recited in claim 1, wherein each of said pair of thread forms is manufactured from an alumina ceramic ($Al_2O_3$) material.

11. The mechanical fastener system recited in claim 1, wherein each of said pair of thread forms is manufactured from a zirconia ceramic ($ZrO_2$) material.

12. The mechanical fastener system recited in claim 1, wherein said composite washer is manufactured from a carbon fiber-reinforced silicon carbide matrix (C/SiC) composite material.

13. The mechanical fastener system recited in claim 1, wherein said composite washer is manufactured from a silicon carbide fiber-reinforced silicon carbide matrix (SiC/SiC) composite material.

14. The mechanical fastener system recited in claim 1, wherein said nut is manufactured from an alumina ceramic ($Al_2O_3$) material.

15. The mechanical fastener system recited in claim 1, wherein said nut is manufactured from a zirconia ceramic ($ZrO_2$) material.

16. The mechanical fastener system recited in claim 1, wherein the threaded exterior of each of said pair of thread forms and the threaded interior of said nut includes "Edison" lamp-type threads.

17. The combination of a mechanical fastener system and a pair of structural members to be joined together by said fastener system, said combination comprising:
   a composite fastener having a flat, semi-circular head at one end thereof and a shank at the opposite end, said shank having at least one dove tail formed therein and extending through the pair of structural members to be joined together;
   at least one of said pair of structural members having a cavity formed therein within which the semi-circular head of said fastener is countersunk, such that said head lies flush with said one structural member;
   a pair of thread forms disposed in face-to-face alignment so as to surround the shank of said ceramic composite fastener extending through the pair of structural members, each of said pair of thread forms having a threaded exterior and an interior relief that matches the at least one dove tail of the shank of said composite fastener;
   a composite washer having a center slot to receive the shank of the composite fastener therethrough such that said washer surrounds said shank extending through the pair of structural members; and
   a nut having a threaded interior to be rotated into mating engagement around the threaded exteriors of said pair of thread forms, whereby to hold the at least one dove tail of the shank of said fastener in interlocking engagement within the reliefs of said pair of thread forms.

* * * * *